US012650935B2

(12) United States Patent
Li et al.

(10) Patent No.: US 12,650,935 B2
(45) Date of Patent: Jun. 9, 2026

(54) SYSTEMS, METHODS, AND APPARATUS FOR CACHE OPERATION IN STORAGE DEVICES

(71) Applicant: Samsung Electronics Co., Ltd., Suwon-si (KR)

(72) Inventors: Zongwang Li, Dublin, CA (US); Tong Zhang, Mountain View, CA (US); Rekha Pitchumani, Oak Hill, VA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/630,988

(22) Filed: Apr. 9, 2024

(65) Prior Publication Data

US 2024/0403241 A1     Dec. 5, 2024

Related U.S. Application Data

(60) Provisional application No. 63/470,809, filed on Jun. 2, 2023.

(51) Int. Cl.
| | |
|---|---|
| *G06F 13/16* | (2006.01) |
| *G06F 12/02* | (2006.01) |
| *G06F 13/18* | (2006.01) |

(52) U.S. Cl.
CPC ...... *G06F 13/1673* (2013.01); *G06F 12/0253* (2013.01); *G06F 13/18* (2013.01)

(58) Field of Classification Search
None
See application file for complete search history.

(56) References Cited

U.S. PATENT DOCUMENTS 6,826,583 B1 * 11/2004 Flood .................. G06F 12/0269
                                                   711/E12.012
9,135,181 B2     9/2015 Eleftheriou et al.
(Continued)

FOREIGN PATENT DOCUMENTS

| CN | 108664217 A | 10/2018 |
|---|---|---|
| CN | 106528438 B | 8/2019 |

(Continued)

OTHER PUBLICATIONS

Egger et al. "Scratchpad Memory Management for Portable Systems with a Memory Management Unit." Oct. 2006. ACM. Emsoft '06. pp. 321-330.*
Wu et al. "Improving Performance for Flash-based Storage Systems through GC-aware Cache Management." 2017. IEEE. IEEE Transactions on Parallel and Distributed Systems.*

(Continued)

*Primary Examiner* — Nathan Sadler
(74) *Attorney, Agent, or Firm* — Renaissance IP Law Group LLP

(57) ABSTRACT

A device may include a storage medium, a cache medium, a buffer medium, and at least one control circuit configured to perform one or more operations including receiving a first request to access the storage medium, accessing, based on the first request, the cache medium, copying, from a portion of the storage medium to the buffer medium, data, modifying, based on the copying, an availability of the at least a portion of the storage medium, receiving a second request to access the storage medium, and accessing, based on the second request, the buffer medium. The one or more operations may include determining a location of data associated with the second request, and accessing, based on the determining, the buffer medium. The one or more operations may include receiving information about a location of data associated with the second request, and accessing, based on the information, the buffer medium.

20 Claims, 10 Drawing Sheets

(56) References Cited

U.S. PATENT DOCUMENTS

| | | | |
|---|---|---|---|
| 10,102,119 B2 | 10/2018 | Gopinath et al. | |
| 10,585,590 B2 | 3/2020 | Sunata et al. | |
| 10,684,953 B2 | 6/2020 | Cho | |
| 10,824,353 B2 | 11/2020 | Igahara et al. | |
| 10,847,196 B2 | 11/2020 | Ware et al. | |
| 11,194,728 B2 | 12/2021 | Roberts | |
| 11,249,903 B2 | 2/2022 | Byun | |
| 11,487,658 B2 | 11/2022 | Byun | |
| 11,550,502 B2 | 1/2023 | Lee | |
| 12,314,180 B2 | 5/2025 | Wang et al. | |
| 2011/0078380 A1* | 3/2011 | Gendler | G06F 12/0862 |
| | | | 711/E12.024 |
| 2013/0247008 A1 | 9/2013 | Mitran et al. | |
| 2021/0216239 A1 | 7/2021 | Dutta et al. | |
| 2022/0164286 A1 | 5/2022 | Jeong et al. | |
| 2022/0342595 A1* | 10/2022 | Chatterjee | G06F 3/0659 |

FOREIGN PATENT DOCUMENTS

| | | |
|---|---|---|
| CN | 114691024 A | 7/2022 |
| KR | 20220017006 A | 2/2022 |

OTHER PUBLICATIONS

Patterson et al. Computer Organization and Design. 2018. Morgan Kaufmann. pp. 818-834.*

IEEE. IEEE 100: The Authoritative Dictionary of IEEE Standards Terms. Dec. 2000. IEEE. 7th ed. pp. 267-268.*

Cui, Jinhua et al., "ShadowGC: Cooperative Garbage Collection with Multi-level Buffer for Performance Improvement in NAND flash-based SSDs", 2018 Design, Automation & Test in Europe Conference & Exhibition (Date 2018), 2018, pp. 1247-1252.

European Extended Search Report for Application No. 24177356.3, mailed Oct. 14, 2024.

* cited by examiner

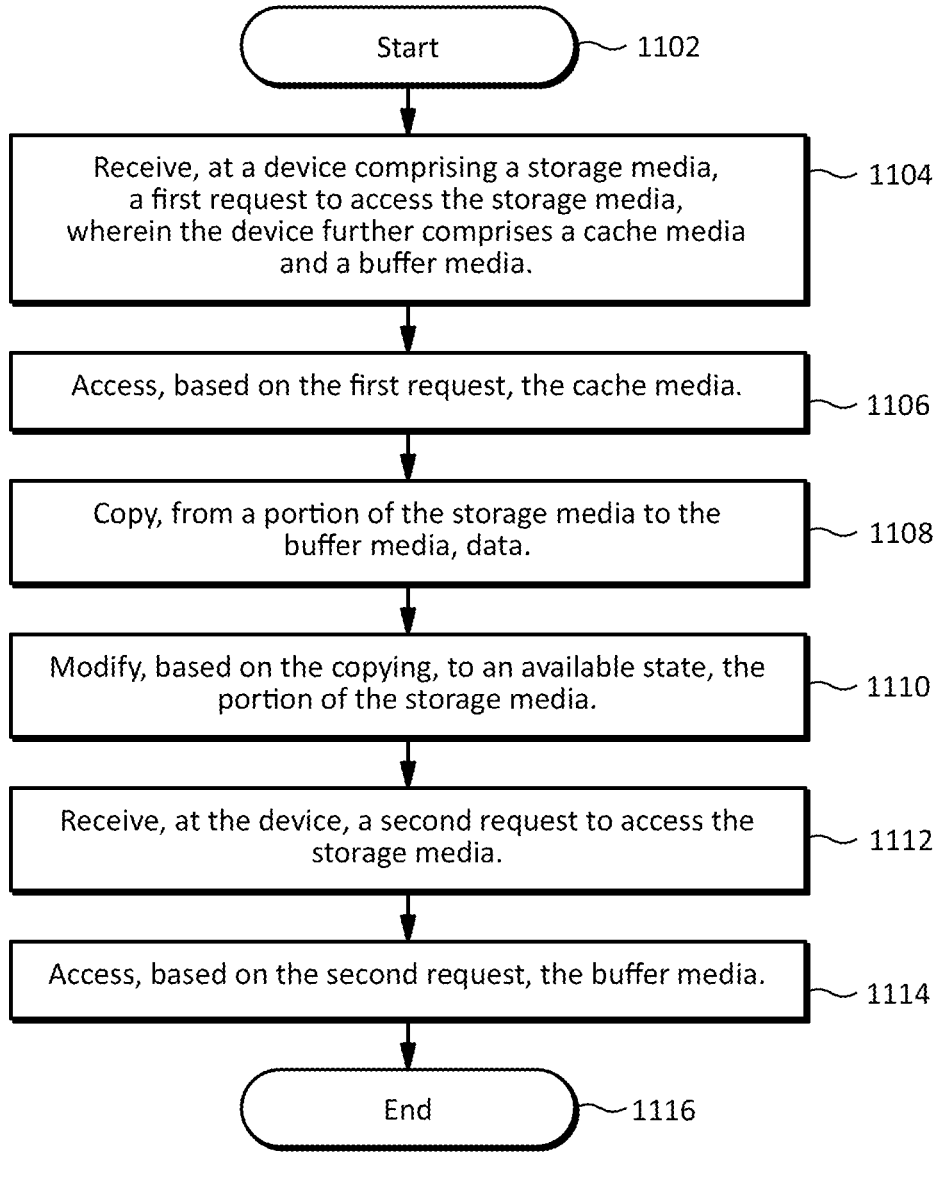

Start ~ 1102

Receive, at a device comprising a storage media, a first request to access the storage media, wherein the device further comprises a cache media and a buffer media. ~ 1104

Access, based on the first request, the cache media. ~ 1106

Copy, from a portion of the storage media to the buffer media, data. ~ 1108

Modify, based on the copying, to an available state, the portion of the storage media. ~ 1110

Receive, at the device, a second request to access the storage media. ~ 1112

Access, based on the second request, the buffer media. ~ 1114

End ~ 1116

FIG. 11

SYSTEMS, METHODS, AND APPARATUS FOR CACHE OPERATION IN STORAGE DEVICES

REFERENCE TO RELATED APPLICATION

This application claims priority to, and the benefit of, U.S. Provisional Patent Application Ser. No. 63/470,809 filed Jun. 2, 2023 which is incorporated by reference.

TECHNICAL FIELD

This disclosure relates generally to caches and storage, and more specifically to systems, methods, and apparatus for cache operation in storage devices.

BACKGROUND

A storage device may include storage media configured to store data received at the storage device. A storage device may also include a cache to store a copy of data stored in the storage media. An application or other user may access the storage device using one or more communication interfaces, communication protocols, and/or the like.

The above information disclosed in this Background section is only for enhancement of understanding of the background of the inventive principles and therefore it may contain information that does not constitute prior art.

SUMMARY

A device may include a storage medium, a cache medium, a buffer medium, and at least one control circuit configured to perform one or more operations including receiving a first request to access the storage medium, accessing, based on the first request, the cache medium, copying, from a portion of the storage medium to the buffer medium, data, modifying, based on the copying, an availability of the at least a portion of the storage medium, receiving a second request to access the storage medium, and accessing, based on the second request, the buffer medium. The one or more operations may include determining a location of data associated with the second request, and accessing, based on the determining, the buffer medium. The one or more operations may include receiving information about a location of data associated with the second request, and the accessing the buffer medium may be based on the information. The information may include a portion of an address. The information may include a portion of a data structure. The device may further include a first queue configured to store an access request for the copying, and a second queue configured to store the second request. The second request may include a memory access request. The one or more operations may include accessing, based on a first priority, the buffer medium, and the copying may be based on a second priority. The portion of the storage medium may be a first portion of the storage medium, and the one or more operations may include reading, from the buffer medium, based on the copying, the data, and storing, in a second portion of the storage medium, the data. The accessing the buffer medium may be based on a first priority, and the reading may be based on a second priority.

A method may include receiving, at a device including a storage medium, a first request to access the storage medium, wherein the device may further include a cache medium and a buffer medium, accessing, based on the first request, the cache medium, copying, from a portion of the storage medium to the buffer medium, data, modifying, based on the copying, an availability of the portion of the storage medium, receiving, at the device, a second request to access the storage medium, and accessing, based on the second request, the buffer medium. The method may further include determining a location of data associated with the second request, and accessing, based on the determining, the buffer medium. The method may further include receiving information about a location of data associated with the second request, and accessing, based on the information, the buffer medium. The information may include a portion of an address. The information may include a portion of a data structure. The first request may include a first memory access request, and the second request may include a second memory access request. The accessing, based on the second request, the buffer medium, may be performed with a first priority, and the copying may be performed with a second priority.

A device may include a storage medium, a buffer medium, and at least one control circuit configured to perform one or more operations including copying, from a portion of the storage medium to the buffer medium, data, modifying, based on the copying, an availability of the portion of the storage medium, receiving a request to access the storage medium, and accessing, based on the request, the buffer medium. The one or more operations may include accessing, based on the request, the storage medium. The one or more operations may include receiving information about a location of data associated with the request, and the accessing may be based on the information.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 11 illustrates an embodiment of a method for accessing a cache medium at a device in accordance with example embodiments of the disclosure.

DETAILED DESCRIPTION

Figure 1:
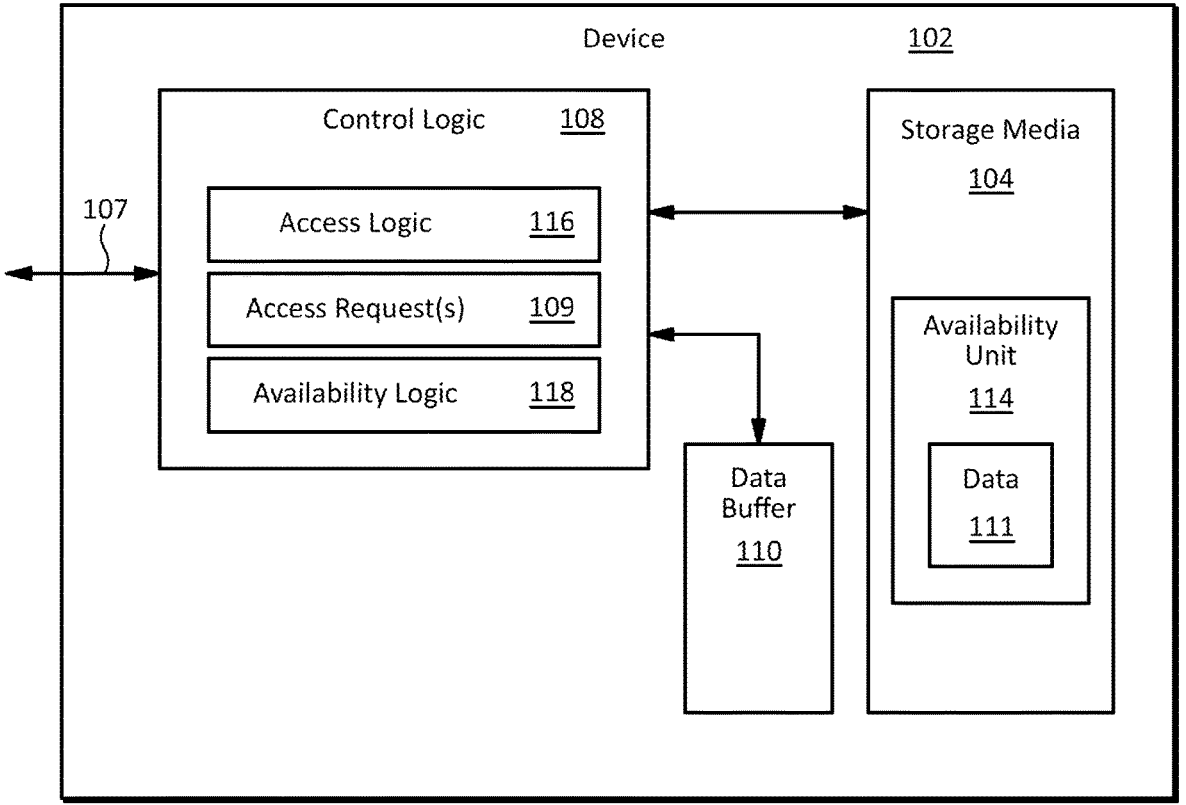
FIG. 1 illustrates an embodiment of a device having a data buffer for implementing a media availability scheme in accordance with example embodiments of the disclosure.

A storage device may include a device cache that may reduce the latency of some access operations, for example, by storing a copy of frequently and/or recently accessed data in cache media that may have a relatively low access latency compared to storage media. A storage device may receive a request to access data that is present in the device cache (which may be referred to as a cache hit) and process the request by reading or writing the requested data from or to the device cache which may have a relatively low access latency. The storage device may receive a request to access data that is not present in the device cache (which may be referred to as a cache miss) and process the request by reading or writing data from or to the storage media which may have a relatively high access latency.

A data access operation on storage media may have an especially long latency if the storage media is involved in an operation related to the availability of the storage media. For example, a storage device may implement a garbage collection operation in which one or more pages of valid data in a first erase block (which may also include one or more pages of invalid data) may be copied to a second (e.g., empty) erase block to enable the first erase block to be erased to make it available for storing new valid data. An access request for one or more pages of valid data involved in a garbage collection operation may experience a relatively long latency (which may be referred to as a tail latency). For example, the access request may not be processed until the garbage collection operation is completed.

Some storage devices may include a garbage collection buffer that may be used to store one or more pages of valid data involved in a garbage collection operation. In an access scheme in accordance with example embodiments of the disclosure, a storage device may process a request to access storage media by accessing a garbage collection buffer. For example, a storage device may copy a page of valid data from an erase block to a garbage collection buffer to enable the storage device to perform an erase operation on the erase block. The storage device may receive a request to read the page of valid data while the page of valid data is stored in the garbage collection buffer. Thus, the storage device may process the request by reading the page of valid data from the garbage collection buffer. Depending on the implementation details, this may reduce a latency (e.g., a tail latency) associated with servicing the request.

In some embodiments, a storage device in accordance with the disclosure may use metadata to determine if a request to access storage media may be processed by accessing a device cache and/or a garbage collection buffer. For example, a storage device may implement a metadata structure having a first portion including metadata (e.g., one or more tags, indexes, mappings, and/or the like) that may provide access to one or more entries in a device cache, and a second portion including metadata (e.g., one or more tags, indexes, hash tables, mappings, and/or the like) that may provide access to one or more entries in a garbage collection buffer.

Some embodiments of a storage device in accordance with the disclosure may include one or more queues for accessing one or more caches, buffers, and/or the like. For example, some embodiments may include an access request queue to store read requests to access a garbage collection buffer based on a memory read request received by the storage device. Such an embodiment may also include a garbage collection read queue and/or a garbage collection write queue that may be used by garbage collection logic to read and/or write valid data from and/or to the garbage collection buffer for a garbage collection operation. In some embodiments, one or more of the queues may have different priorities. For example, in some embodiments, the access request queue may have a higher priority than a garbage collection read queue and/or a garbage collection write queue.

This disclosure encompasses numerous principles relating to accessing data using caches, buffers, and/or the like, for storage media. The principles disclosed herein may have independent utility and may be embodied individually, and not every embodiment may utilize every principle. Moreover, the principles may also be embodied in various combinations, some of which may amplify some benefits of the individual principles in a synergistic manner.

For purposes of illustration, some example embodiments may be described in the context of some specific implementation details, however, the principles are not limited to these or any other implementation details. For example, some embodiments may be described in the context of storage devices that may use Compute Express Link (CXL) and/or Nonvolatile Express (NVMe) protocols, however, other embodiments may be implemented with other types of devices such as accelerators, memory expansion devices, memory buffers, and/or the like, using other types of interfaces, protocols, and/or the like.

FIG. 1 illustrates an embodiment of a device having a data buffer for implementing a media availability scheme in accordance with example embodiments of the disclosure. The device 102 may include storage media 104, control logic 108, a data buffer 110, and/or a communication connection 107. The device 102 may communicate with a user (e.g., a host, a server, an application, an operating system, a process, a service, a virtual machine (VM), a VM manager, and/or the like) through a communication connection 107 that may transfer one or more access requests 109 (e.g., read and/or write requests, load and/or store requests, and/or the like), data 111, configuration information, addresses, metadata, and/or the like, to and/or from the device 102.

The control logic 108 may include access logic 116 that may be configured to process access requests 109 to enable a user to access (e.g., read, write, copy, and/or the like) data in the storage media 104. For example, all or a portion of the storage media 104 may be configured as storage that may be accessed using read and/or write commands with a storage access protocol such as serial ATA (SATA), Small Computer System Interface (SCSI), serial attached SCSI (SAS), Nonvolatile Memory Express (NVMe), and/or the like. As another example, all or a portion of the storage media 104 may be configured as memory that may be accessed using load and/or store commands with a memory access protocol such as direct memory access (DMA), remote direct memory access (RDMA), RDMA over Converged Ethernet (RoCE), Compute Express Link (CXL), and/or the like.

The control logic 108 may include availability logic 118 that may be configured to perform one or more operations relating to the availability of the storage media 104. For example, in some embodiments, some or all of the storage media 104 may be implemented with one or more availability units 114 that may be erased as a unit to make it available to store data 111. In storage media 104 implemented with flash memory, an availability unit may refer to one or more erase blocks, nonvolatile memory (NVM) devices (e.g., NVM dies) NVM device partitions (e.g., planes), and/or the like, or any combination thereof. As another example, in storage media 104 implemented with magnetic media (e.g., shingled magnetic recording (SMR) media), an availability unit may refer to one or more shingle sections, zones, sectors, tracks, and/or the like, or any combination thereof. As a further example, in storage media 104 implemented with storage class memory (e.g., magnetoresistive random-access memory (MRAM), resistive random-access memory (ReRAM), phase change memory (PCM), cross-gridded nonvolatile memory, memory with bulk resistance change, and/or the like), an availability unit may refer to one or more banks, programming groups, dies, and/or the like, or any combination thereof.

In some embodiments in which the storage media 104 may be implemented at least partially with flash memory, the availability logic 118 may implement a garbage collection scheme for the flash memory. In such embodiments, the availability units 114 may be implemented as erase blocks, and the availability logic 118 may copy one or more pages of valid data in a first erase block (which may also include one or more pages of invalid data) to a second (e.g., empty) erase block to enable the first erase block to be erased to make it available for storing new valid data.

In some embodiments, the availability logic 118 may use a data buffer 110 for an availability operation. For example, in an embodiment in which the availability logic 118 may implement a garbage collection scheme for storage media 104 implemented with flash memory, the availability logic 118 may copy valid data from an erase block to the data buffer 110 to enable the erase block to be erased. Depending on the implementation details, this may reduce the amount of flash memory that may be reserved for garbage collection operations which, in turn, may increase the overall storage capacity and/or utilization of the storage media 104.

Any of the storage media disclosed herein, including the storage media 104 may be implemented with any type of nonvolatile memory media that may be used as storage media based, for example, on solid state media, magnetic media, optical media, and/or the like. For example, in some embodiments, storage media may be implemented with not-AND (NAND) flash memory, not-OR (NOR) flash memory, persistent memory such as cross-gridded nonvolatile memory, memory with bulk resistance change, phase change memory (PCM), and/or the like, or any combination thereof.

Any of the cache media, buffer media, and/or the like, disclosed herein, including the data buffer 110, may be implemented with volatile memory media such as dynamic random access memory (DRAM), static random access memory (SRAM), and/or the like. Additionally, or alternatively, any of the cache media, buffer media, and/or the like, disclosed herein may be implemented with any type of nonvolatile memory media based on solid state media, magnetic media, optical media, and/or the like, as described above, or any combination thereof.

In some embodiments, the storage media 104 and data buffer 110 may be implemented with media that may have one or more relative characteristics that may make one or both of them more suitable for their respective functions. For example, in some embodiments, the storage media 104 may be implemented with NAND flash memory which may have a relatively higher capacity, lower cost, and/or the like, whereas the data buffer 110 may be implemented with DRAM which may have relatively lower access latency. As another example, in some embodiments, the storage media 104 may be implemented with magnetic media which may have a relatively higher capacity, lower cost, and/or the like, whereas the data buffer 110 may be implemented with NAND flash which may have relatively lower access latency. In some other embodiments, some or all of the storage media 104 and some or all of the data buffer 110 may be implemented with the same or similar types of media.

Any of the communication connections disclosed herein, including the communication connection 107, may be implemented with any interconnect and/or storage interface and/or protocol such as Peripheral Component Interconnect (PCIe), Nonvolatile Memory Express (NVMe), NVMe Key-Value (NVMe-KV), direct memory access (DMA), serial ATA (SATA), Small Computer System Interface (SCSI), serial attached SCSI (SAS), Compute Express Link (CXL) and/or a one or more CXL protocols such as CXL.mem, CXL.cache, and/or CXL.io, Gen-Z, Coherent Accelerator Processor Interface (CAPI), Cache Coherent Interconnect for Accelerators (CCIX), and/or the like, or any combination thereof. Alternatively, or additionally, any of the communication connections disclosed herein, including the communication connection 107, may be implemented with any networking interface and/or protocol such as Ethernet, Transmission Control Protocol/Internet Protocol (TCP/IP), remote direct memory access (RDMA), RDMA over Converged Ethernet (RoCE), Fibre Channel, InfiniBand (IB), iWARP, NVMe-over-fabrics (NVMe-oF), and/or the like, or any combination thereof. Alternatively, or additionally, any of the communication connections disclosed herein, including the communication connection 107, may be implemented with any control and/or management interface including NVMe Management Interface (NVMe-MI), System Management Bus (SMBus), and/or the like.

Any of the devices disclosed herein, including the device 102, may be implemented in any form such as storage devices, accelerators, memory buffers (e.g., CXL memory buffers), graphics processing units (GPUs), network interface cards and/or network interface controllers (NICs), and/or the like, having any physical form factor including one or more form factors used for storage devices (e.g., solid state drives (SSDs), hard disk drives (HDDs), and/or the like) and/or other devices such as Peripheral Component Interconnect Express (PCIe) add-in cards, 3.5 inch drives, 2.5 inch drives, 1.8 inch drives, M.2 drives, U.2 and/or U.3 drives, Enterprise and Data Center SSD Form Factor (ED-SFF) drives, any of the SFF-TA-100X form factors (e.g., SFF-TA-1002), NF1, and/or the like, using any connector configuration such as PCIe, SATA, SCSI, SAS, M.2, U.2, U.3 and/or the like. In some embodiments, a device may be implemented in any other form, for example, as a collection of one or more components on a circuit board (e.g., integrated into a server motherboard, backplane, midplane, and/or the like).

Any of the devices disclosed herein, including the device 102, may be used in connection with one or more personal computers, smart phones, tablet computers, servers, server chassis, server racks, datarooms, datacenters, edge datacenters, mobile edge datacenters, and/or, the like, or any combinations thereof.

In some embodiments, control logic (e.g., one or more control circuits) may be configured to operate some or all of a medium (e.g., storage medium, a cache medium, a buffer medium, a memory medium, and/or the like) in a certain manner, for example, as a cache, as a data buffer, as a memory space, as a storage space, and/or the like (any of which may be visible or invisible to a user). In such embodiments, the medium may be referred to as being configured in a certain manner, even though the control logic may perform one or more actions, operations, and/or the like, that may implement the manner of operation. For example, in some embodiments, control logic may be configured to operate a cache medium or other medium as a garbage collection buffer for a storage medium. In such an embodiment, the cache medium may be referred to as being configured as a cache, even though the control logic may perform one or more actions, operations, and/or the like, that may cause the cache medium to operate as a garbage collection buffer for the storage medium.

Figure 2:
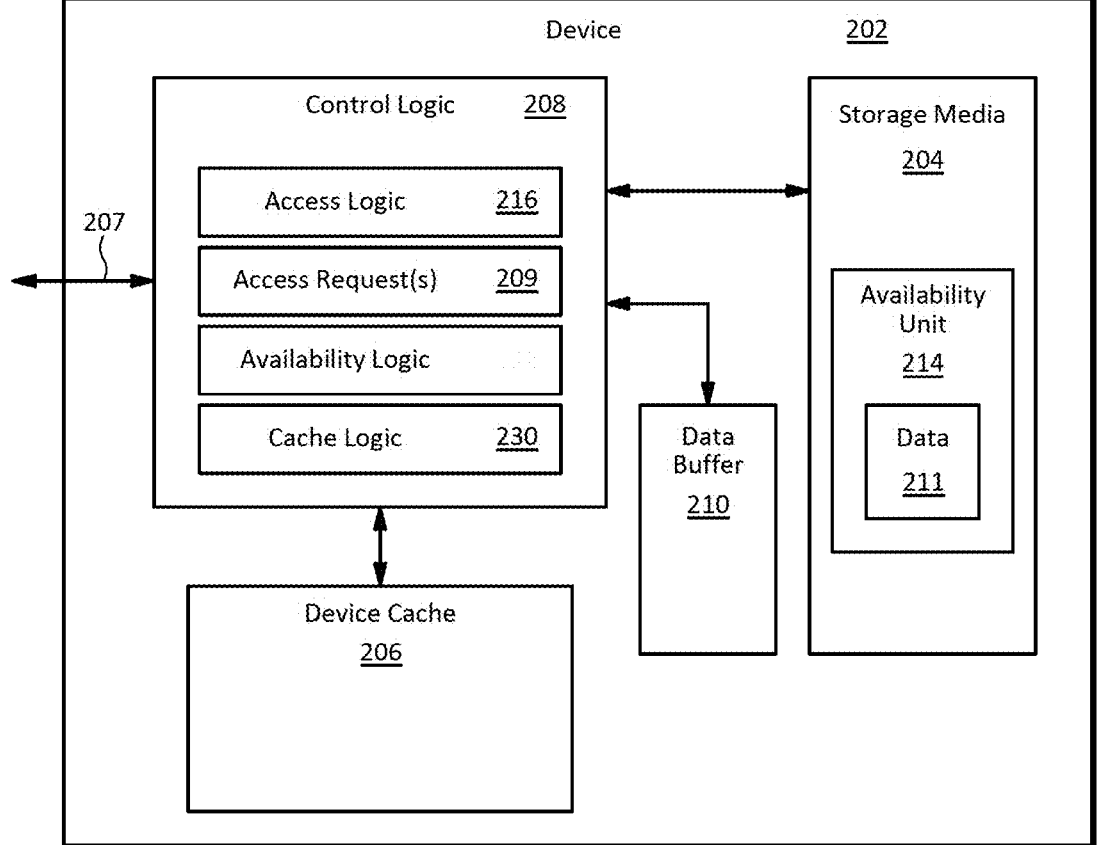
FIG. 2 illustrates an embodiment of a device having a device cache and a data buffer for implementing a media availability scheme in accordance with example embodiments of the disclosure.

FIG. 2 illustrates an embodiment of a device having a device cache and a data buffer for implementing a media availability scheme in accordance with example embodiments of the disclosure. The device 202 illustrated in FIG. 2 may include one or more elements similar to the embodiment illustrated in FIG. 1 in which similar elements may be indicated by reference numbers ending in, and/or containing, the same digits, letters, and/or the like.

In some aspects, the configuration and/or operation of the device 202 illustrated in FIG. 2 may be similar to the configuration and/or operation of the device 102 illustrated in FIG. 1. However, the embodiment illustrated in FIG. 2 may include a device cache 206 that may be used, for example, to store a copy of data 211 stored in the storage media 204. Moreover, in the embodiment illustrated in FIG. 2, the control logic 208 may include cache logic 230 that may control at least a portion of the operation of the device cache 206 and/or the data buffer 210.

Depending on the implementation details, the device cache 206 may be used to reduce a latency associated with accessing data 211 stored in the storage media 204. For example, in some embodiments, at least a portion of the storage media 204 may be configured as memory that may be accessed using a memory access protocol such as CXL.mem. In such an embodiment, at least a portion of the device cache 206 may be configured to store a copy of data 211 that may be stored (previously, currently, and/or eventually, e.g., depending on a cache policy) in a corresponding portion of the storage media 204. The access logic 216 and/or cache logic 230 may be configured to process a request 209 to access data 211 in the storage media 204 by accessing a copy of the data stored in the device cache 206. In some embodiments, the device cache 206 may be implemented with memory media (e.g., dynamic random access memory (DRAM)) that may have a lower access latency than memory media used to implement the storage media 204 (e.g., NAND flash memory). Thus, the access logic 216 and/or cache logic 230 may process the request 209 with a lower latency by accessing the device cache 206 (e.g., instead of, and/or in addition to, the storage media 204).

Additionally, or alternatively, the access logic 216 and/or cache logic 230 may be configured to process a request 209 to access data 211 in the storage media 204 by accessing a copy of the data stored in the data buffer 210. For example, in some embodiments, at least a portion of the data buffer 210 may be configured as a garbage collection buffer (that may be implemented, e.g., with DRAM) for at least a portion of the storage media 204 (that may be implemented, e.g., with flash memory). The control logic 208 may receive a request 209 to access data 211 in the storage media 204. The access logic 216 and/or cache logic 230 may determine (e.g., using metadata such as a tag, index, and/or the like) that a copy of the requested data is located in the data buffer 210 (e.g., a cache hit based on the requested data being involved in a garbage collection operation) and process the request 209 by accessing (e.g., reading the requested data from or writing the requested data to) the data buffer 210. Depending on the implementation details, this may reduce the latency associated with processing the access request 209.

Additionally, or alternatively, the access logic 216 and/or cache logic 230 may be configured to process the request 209 by accessing the device cache 206. For example, in some embodiments, based on receiving a request 209 to access data 211 in the storage media 204, the access logic 216 and/or cache logic 230 may perform one or more checks (e.g., using metadata such as tags, indexes, and/or the like) to determine if a copy of the requested data is located in either, both, or neither of the device cache 206 and/or data buffer 210. If a copy of the requested data is located in only one of the device cache 206 or data buffer 210, the access logic 216 and/or cache logic 230 may access the cache in which the copy is located. If a copy of the requested data is located in both the device cache 206 and data buffer 210, the access logic 216 and/or cache logic 230 may access the cache or buffer that may have the lowest latency (e.g., based on media access speed, metadata processing time, and/or the like). If neither of the device cache 206 or data buffer 210 has a copy of the requested data, the access logic 216 and/or cache logic 230 may process the request 209 by accessing the storage media 204. Depending on the implementation details, this may reduce the latency (e.g., a tail latency) associated with processing the access request 209. Additionally, or alternatively, and depending on the implementation details, this may increase the effective size of the device cache 206, for example, by enabling a portion of the data buffer 210 to be used as both a device cache and a buffer for a garbage collection or other availability operation for the storage media 204.

Figure 3:
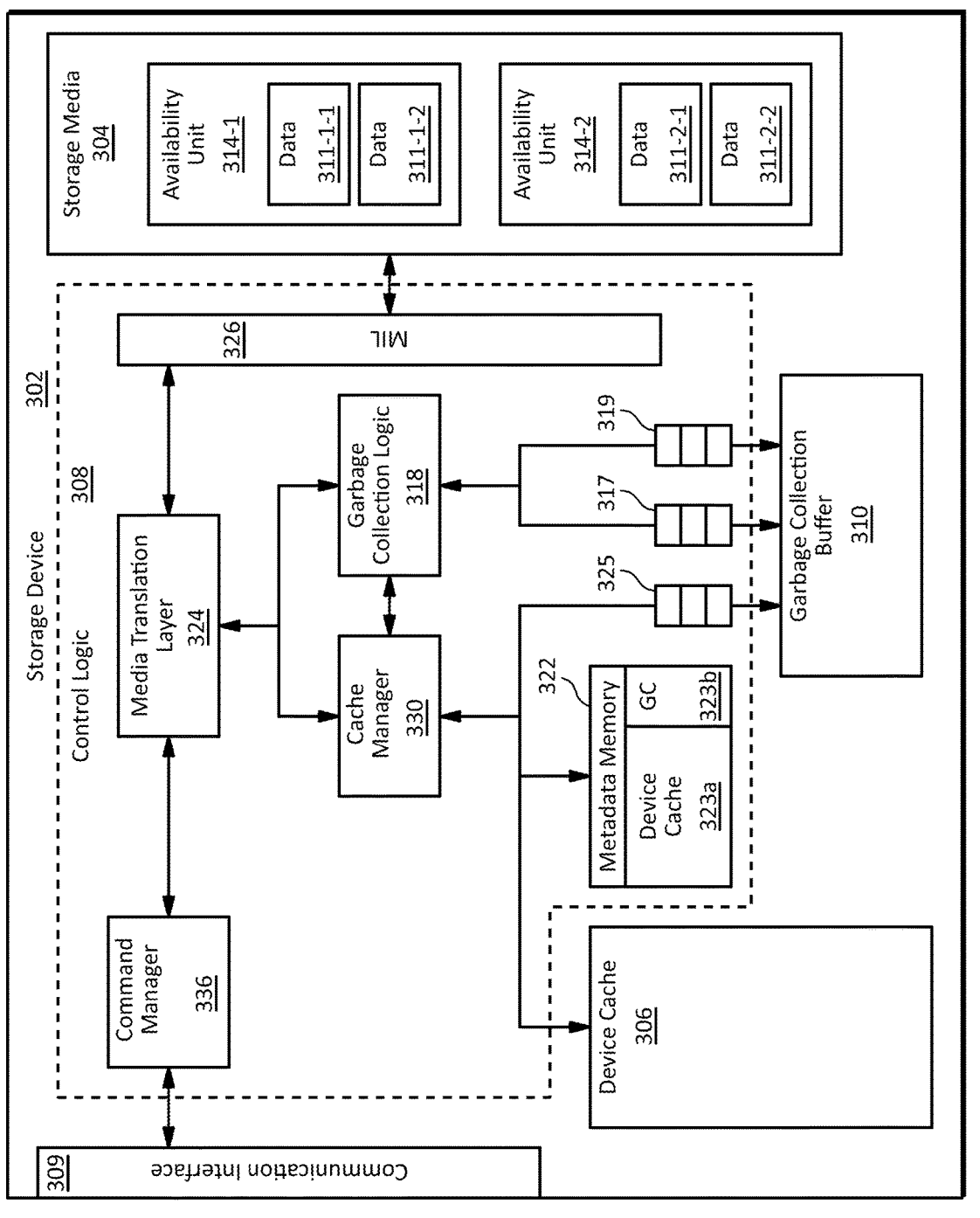
FIG. 3 illustrates an example embodiment of a storage device having a device cache and a garbage collection buffer in accordance with example embodiments of the disclosure.

FIG. 3 illustrates an example embodiment of a storage device having a device cache and a garbage collection buffer in accordance with example embodiments of the disclosure. The device 302 illustrated in FIG. 3 may be used to implement, and/or may be implemented with, for example, the device illustrated in FIG. 2 in which similar elements may be indicated by reference numbers ending in, and/or containing, the same digits, letters, and/or the like.

Referring to FIG. 3, the storage device 302 may include storage media 304, a device cache 306, a garbage collection buffer 310, and/or control logic 308 that may include one or more of a command manager 336, a cache manager 330, a metadata memory 322, garbage collection logic 318, a garbage collection read queue 317, a garbage collection write queue 319, an access request queue 325, a media translation layer (MTL) 324, and/or a media interface layer (MIL) 326.

The storage media 304 may be implemented with any media that may be configured with availability units 314-1 (AU-1) and 314-2 (AU-2) (which may be referred to individually and/or collectively as 314) on which availability operations may be performed to place one or more of the availability units 314 in a state (e.g., erased) to store data. For example, in embodiments in which at least some of the storage media 304 may be implemented with flash memory, one or more of the availability units 314 may be implemented with erase blocks.

Data may be stored in availability unit 314-1 in data units 311-1-1 and 311-1-2. Data may be stored in availability unit 314-2 in data units 311-2-1 and 311-2-2. Any of the data units 311-1-1, 311-1-2, 311-2-1, and 311-2-2 (which may be referred to individually and/or collectively as 311) may be configured, for example, with units in which data may be loaded, stored, read, written, and/or the like. For example, in embodiments in which at least some of the storage media 304 may be implemented with flash memory, one or more of the data units 311 may be implemented with pages. For purposes of illustration, the storage media 304 may be illustrated with two availability units 314 having two data units each, but any number of availability units 314 and/or data units 311 may be used.

The media interface layer 326 may provide an interface between the storage media 304 and any other logic, functionality, and/or the like, that may access the storage media 304. For example, the media interface layer 326 may implement one or more NAND channels to access one or more NAND flash dies. The media translation layer 324 may perform logical-to-physical address translation, wear-leveling for storage media, error correction, and/or the like.

The garbage collection logic 318 may implement a garbage collection scheme for the storage media 304. For example, if availability unit 314-1 contains a data unit 311-1-1 having valid data and a data unit 311-1-2 having invalid data, the garbage collection logic 318 may copy the valid data in data unit 311-1-1 to the garbage collection buffer 310 and perform a media availability operation (e.g., an erase operation) to place the availability unit 314-1 in an available state (e.g., erased) to store new data. The garbage collection logic 318 may then copy the valid data back to the erased availability unit 314-1 (or another available availability unit).

In some embodiments, the garbage collection logic 318 may use a garbage collection read queue 317 and/or a garbage collection write queue 319 to read valid data from, and/or write valid data to, the garbage collection buffer 310, respectively. In some embodiments, the garbage collection logic 318 may place memory load commands, address information for valid data, and/or the like, in entries in the garbage collection read queue 317, which may process the entries, for example, in first-in-first-out (FIFO) order. In some embodiments, the garbage collection logic 318 may place memory store commands, valid data, address information for valid data, and/or the like, in entries in the garbage collection write queue 319, which may process the entries, for example, in first-in-first-out (FIFO) order.

The command manager 336 may process access requests (e.g., commands) received through the communication interface 309 to access the storage media 304. In some embodiments, the command manager 336 may implement a storage access protocol that may enable a user to access the storage media 304 as storage using read and/or write (read/write) commands that may specify read and/or write addresses with one or more logical block addresses (LBAs). Additionally, or alternatively, the command manager 336 may implement a memory access protocol that may enable a user to access the storage media 304 as memory using load and/or store (load/store) commands that may specify the requested data location as a memory address (e.g., a memory address in system memory). In such an embodiment, the command manager 336 may convert one or more memory addresses to one or more LBAs.

The cache manager 330 may include logic to implement any of the control schemes for the device cache 306 and/or garbage collection buffer 310 disclosed herein. For example, in some embodiments, the command manager 336 may process an access request (e.g., a memory load or storage read command) to access data (requested data) stored in data unit 311-1-1 in availability unit 314-1 in the storage media 304. The command manager 336 may forward the command to the media translation layer 324 which may forward address information (e.g., LBA information) for the requested data to the cache manager 330.

The cache manager 330 may use the address information for the requested data to determine if the requested data (e.g., a copy of the requested data) is located in the device cache 306 and/or the garbage collection buffer 310. In some embodiments, the cache manager 330 may use device cache metadata 323_a_ and/or garbage collection metadata 323_b_ (which may be referred to individually and/or collectively as cache metadata 323 and may be stored in metadata memory 322) to determine if the requested data is located in the device cache 306 and/or the garbage collection buffer 310. Examples of cache metadata 323 may include one or more addresses, pointers, and/or the like, for data stored in the device cache 306 and/or the garbage collection buffer 310, history of data of stored in the device cache 306 and/or the garbage collection buffer 310, valid and/or invalid status information for data of stored in the device cache 306 and/or the garbage collection buffer 310, and/or the like. In some embodiments, the cache manager 330 and/or garbage collection logic 318 may maintain the metadata 323, for example, by updating the metadata 323 (e.g., with information on addresses, history, validity, and/or the like, of data) when data is written to and/or evicted from the device cache 306 and/or the garbage collection buffer 310.

Based on the device cache metadata 323_a_ for the address information for the requested data, the cache manager 330 may determine that a copy of the requested data is located in the device cache 306 (e.g., a device cache hit). The cache manager 330 may therefore load the requested data from the device cache 306 and send it to the media translation layer 324. The media translation layer 324 may forward the requested data to the command manager 336 which may send the requested data to a user that sent the access request (e.g., a memory load or storage read command).

Alternatively, or additionally, based on the garbage collection metadata 323_b_, the cache manager 330 may determine that a copy of the requested data is located in the garbage collection buffer 310 (e.g., a garbage collection buffer hit). The cache manager 330 may therefore load the requested data from the garbage collection buffer 310. In some embodiments, the cache manager 330 may use the access request queue 325 to access the requested data from the garbage collection buffer 310. For example, the cache manager 330 may place a memory load command, address information for the requested data, and/or the like, an entry in the access request queue 325, which may process one or more entries, for example, in first-in-first-out (FIFO) order. After accessing the requested data from the garbage collection buffer 310, the cache manager 330 may send it to the media translation layer 324 which may forward the requested data to the command manager 336 which, in turn, may send the requested data to a user that sent the access request.

In some embodiments, the cache manager 330 and/or garbage collection logic 318 may operate one or more of the garbage collection read queue 317, garbage collection write queue 319, and/or access request queue 325 with one or more priority levels. For example, in some embodiments, the access request queue 325 may operate with a higher priority level than either or both of the garbage collection read queue 317 and/or garbage collection write queue 319. Thus, even if one or more entries are pending in one or both of the garbage collection read queue 317 and/or garbage collection write queue 319, an entry placed in the access request queue 325 may be processed (e.g., the associated requested data may be loaded from the garbage collection buffer 310) before one or more of the entries pending in the garbage collection read queue 317 and/or garbage collection write queue 319 are processed.

In some situations, the cache manager 330 may determine that a copy of data associated with an access request received by the command manager 336 may be located in both the device cache 306 and the garbage collection buffer 310. In such a situation, the cache manager 330 may be configured to a location from which to access the requested data, for example, based on one or more characteristics of the device cache 306, the garbage collection buffer 310, associated logic, and/or the like. For example, in some embodiments, the device cache 306 may have a relatively lower access latency than the garbage collection buffer 310, and thus, the cache manager 330 may access the requested data from the device cache 306.

If the cache manager 330 determines that the requested data is not located in either the device cache 306 or the garbage collection buffer 310, the cache manager 330 may inform the media translation layer 324 which may proceed to access the requested data from the storage media 304. The media translation layer 324 may then forward the requested data to the command manager 336 which, in turn, may send the requested data to a user that sent the access request.

Depending on the implementation details, an embodiment of the storage device illustrated in FIG. 3 may reduce a latency (e.g., a tail latency) associated with accessing data from the storage media 304. Additionally, or alternatively, depending on the implementation details, an embodiment of the storage device illustrated in FIG. 3 may increase the effective size of the device cache 306, for example, by enabling a portion of the garbage collection buffer 310 to be used as both a device cache and a cache for a garbage collection.

Figure 4:
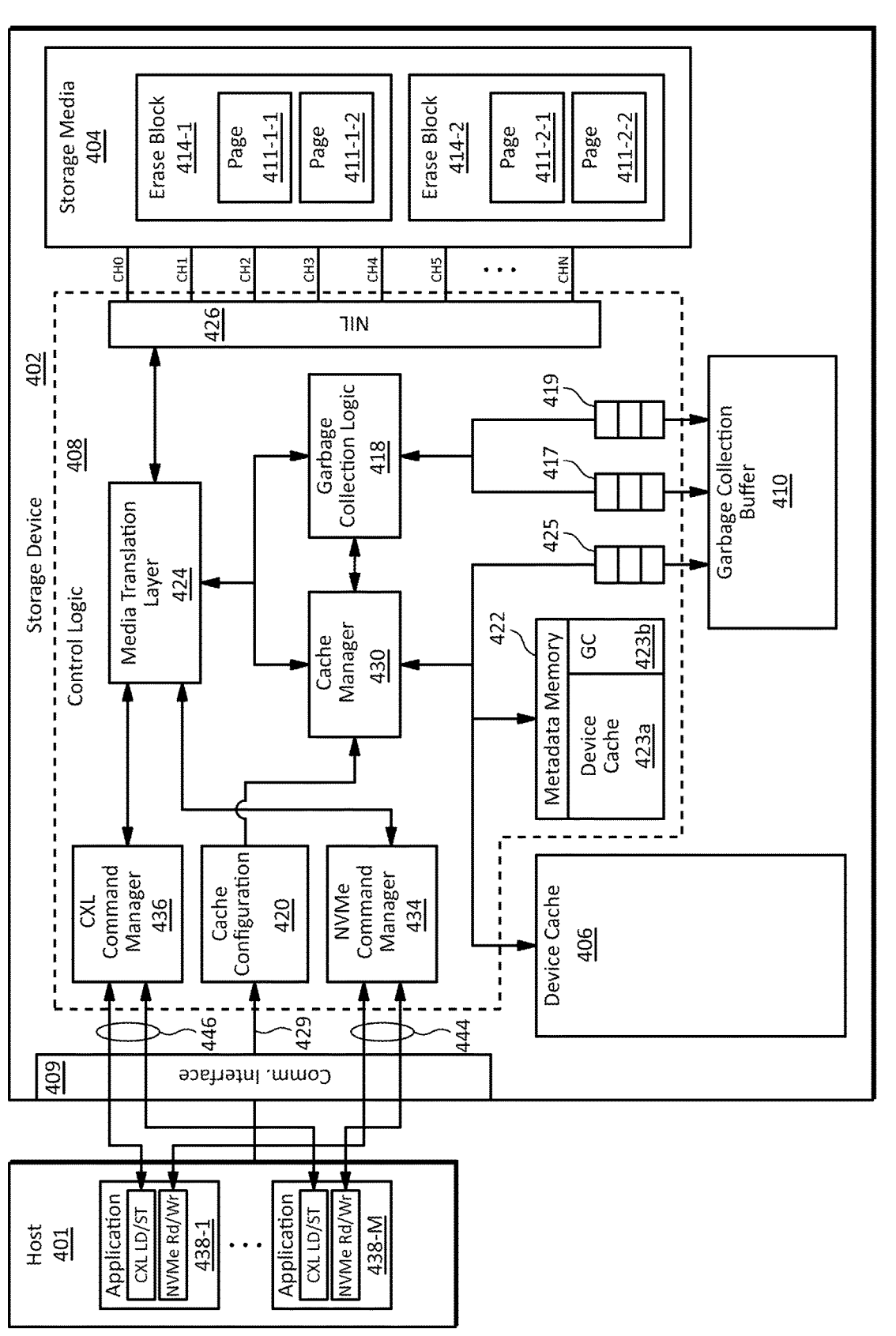
FIG. 4 illustrates an example embodiment of a system having a storage device with a device cache and a garbage collection buffer in accordance with example embodiments of the disclosure.

FIG. 4 illustrates an example embodiment of a system having a storage device with a device cache and a garbage collection buffer in accordance with example embodiments of the disclosure. The system illustrated in FIG. 4 may be used to implement, and/or may be implemented with, for example, any of the devices disclosed herein, including those illustrated in FIG. 2 or FIG. 3 in which similar elements may be indicated by reference numbers ending in, and/or containing, the same digits, letters, and/or the like. For purposes of illustration, the system illustrated in FIG. 4 may be described with example implementation details such as CXL and/or NVMe protocols, flash memory, DRAM and/or static random access memory (SRAM), specific numbers and/or types of components, and/or the like, but other protocols, media, numbers and/or types of components, and/or the like may be used.

Referring to FIG. 4, the system may include a host 401 and a storage device 402. The host 401 may be implemented with any type of processing hardware that may run one or more operating systems, applications, VMs, VM managers, processes, services, and/or the like, that may store data in the storage device 402, but for purposes of illustration, the host 401 is shown as running one or more applications 438-1, 438-2, . . . , 438-M (which may be referred to individually and/or collectively as 438).

The storage device 402 may include storage media 404, a device cache 406, control logic 408, a garbage collection buffer 410, and/or a communication interface 409. The control logic 408 may include a media translation layer (MTL) 424, a cache manager 430, memory for cache configuration information 420, garbage collection logic 418, metadata memory 422, a garbage collection read queue 417, a garbage collection write queue 419, an access request queue 425, a first command manager 436, and/or a second command manager 434.

The storage media 404 may be implemented, for example, with one or more NAND flash memory dies that may be arranged in channels CH0, CH1, . . . CHN that may be controlled by control logic (e.g., one or more NAND channel controllers) in a NAND interface layer 426. The NAND flash memory may be configured with a first erase block 414-1 having pages 411-1-1 and 411-1-2 and a second erase block 414-2 having pages 411-2-1 and 411-2-2, but any number of erase blocks and/or pages in each block may be used. The erase blocks 414-1 and 414-2 (which may be referred to individually and/or collectively as 414) and the pages 411-1-1, 411-1-2, 411-2-1, and 411-2-2 (which may be referred to individually and/or collectively as 411) may be configured across any arrangement of channels, dies, planes, and/or the like. In an embodiment in which some or all of the storage media 404 may be implemented with flash memory, the MTL 424 may be implemented, at least partially, with a flash translation layer (FTL).

In some aspects, the configuration and/or operation of the storage device 402 illustrated in FIG. 4 may be similar to the configuration and/or operation of the storage device 302 illustrated in FIG. 3, but with the availability units and data units implemented as erase blocks and pages, respectively. However, the embodiment illustrated in FIG. 4 may also implement a dual-mode (e.g., dual access method) scheme in which a user (e.g., an application 438) may access the storage media 404 (e.g., through the MTL 424) as memory using load and/or store (load/store) commands (e.g., using the first command manager 436) and/or as storage using storage read and/or write (read/write) commands (e.g., using the second command manager 434).

The first command manager 436 may implement a CXL protocol that may enable a user (e.g., an application 438) to access the storage media 404 as memory using load/store commands that may specify the requested data location as a memory address (e.g., a memory address that may be mapped to a system memory space at the host 401. The load/store commands, load data, store data, and/or the like may be sent and/or received using one or more connections 446, for example, using a CXL.mem protocol. In some embodiments, the first command manager 436 may implement a memory-to-storage address translator (e.g., a CXL-to-LBA or CXL2LBA translator) to convert a memory address included with a load/store command to an LBA that the MTL 424 may use to access the requested data in the storage media 404. Alternatively, or additionally, one or more of the MTL 424, the cache manager 430, and/or the garbage collection logic 418 may implement a memory-to-storage address translator.

The second command manager 434 may implement an NVMe protocol that may enable a user (e.g., an application 438) to access the storage media 404 as storage using read/write commands that may specify read and/or write addresses with one or more LBAs. The read/write commands, write data, read data, and/or the like may be sent and/or received using one or more connections 444 using an NVMe protocol. In some embodiments, the NVMe protocol may be implemented with an underlying CXL.io transport scheme.

In some embodiments, the control logic 408 may include a memory to store cache configuration information 420 for the cache manager 430. Examples of the cache configuration information 420 may include information on the configuration and/or operation of the device cache metadata 423*a*, garbage collection buffer metadata 423*b*, the device cache 406, the queues 417, 419, and/or 425, the garbage collection buffer 410, and/or the like. For example, the cache configuration information 420 may determine cache parameters such as cache size and/or arrangement (e.g., number of sets, ways, and/or the like), cache mapping (e.g., direct, set-associative, and/or the like), type of memory used for metadata and/or cache memory (e.g., tag-in SRAM, tag-in DRAM), cache replacement policies (e.g., random, least recently used (LRU), least frequently used (LFU)), and/or the like. In some embodiments, the cache configuration information 420 may be provided by a user (e.g., at a host as shown by arrow 429), an administrator, and/or the like, using one or more interfaces, protocols, and/or the like, that may support configuration and/or management operations such as NVMe Management Interface (NVMe-MI), CXL.io, System Management Bus (SMBus), and/or the like.

In some embodiments, the device cache metadata 423*a* may point to the device cache 406, and/or the garbage collection buffer metadata 423*b* may point to the garbage collection buffer 410. Although the metadata 423*a* and 423*b* (which may be referred to individually and/or collectively as 423) is not limited to any specific implementation details, in some embodiments, the device cache metadata 423*a* may be implemented with a tag-in SRAM configuration and a set associative cache arrangement in which tags may be stored in SRAM (e.g., in metadata memory 422) and associated cache data may be stored in DRAM (e.g., in device cache 406).

In some other embodiments, the device cache metadata 423*a* may be implemented with a tag-in DRAM configuration and a direct mapped or set associative cache arrangement in which both cache metadata and cache data may be stored in DRAM (e.g., in device cache 406). Thus, in such an embodiment, the device cache metadata 423*a* and cache data may be stored in the same row and/or column of a page of DRAM. Depending on the implementation details, a tag-in DRAM configuration may reduce cache hit and/or cache miss latency. Additionally, or alternatively, depending on the implementation details, a tag-in DRAM configuration may improve the flexibility of configuring and/or programming a cache scheme in accordance with example embodiments of the disclosure.

In some embodiments, a cache structure for the garbage collection buffer 410 may be implemented with a tag-in SRAM configuration. For example, tag information may be stored in SRAM in the metadata memory 422, whereas the associated cache data pointed to by the metadata may be stored in the garbage collection buffer 410 which may be implemented, for example, with DRAM. Such a configuration may be beneficial, for example, in implementations in which the garbage collection buffer 410 may be organized based on NAND physical pages (e.g., physical block addresses (PBAs)) and/or an error correction structure.

In some embodiments, the garbage collection buffer metadata 423*b* may use a hash-based data structure, NAND page based direct mapping, and/or a random replacement policy.

Referring again to FIG. 4, in some embodiments, the MTL 424 may track a previous PBA and a new PBA for an LBA of data that may be copied to the garbage collection buffer 410 during a garbage collection operation. The MTL 424 may modify (e.g., update) a mapping table (e.g., an LBA-to-PBA mapping table) to reflect the new PBA of the data associated with the LBA. This may enable the cache manager 430, the garbage collection logic 418, and/or the like, to determine the location of the data associated with the LBA.

In some embodiments, different cache metadata formats, cache structures, mappings, policies, and/or the like, may be used for the device cache 406 and/or garbage collection buffer 410, based, for example, on the relative characteristics (e.g., size) of their user (e.g., host) address space sizes, cache address ranges, and/or the like. For example, a host memory address range for the device cache 406 may be relatively large compared to an internal or local address (e.g., LBA and/or PBA) range used by the garbage collection buffer 410. Thus, metadata used for the garbage collection buffer 410 may be relatively small and/or simple compared to metadata used for the device cache 406. Moreover, depending on the implementation details, using a tag-in SRAM technique for the garbage collection buffer metadata 423*b* may reduce the complexity, cost, development time, and/or the like associated with implementing the garbage collection buffer metadata 423*b* with a tag-in DRAM configuration.

Figure 5:
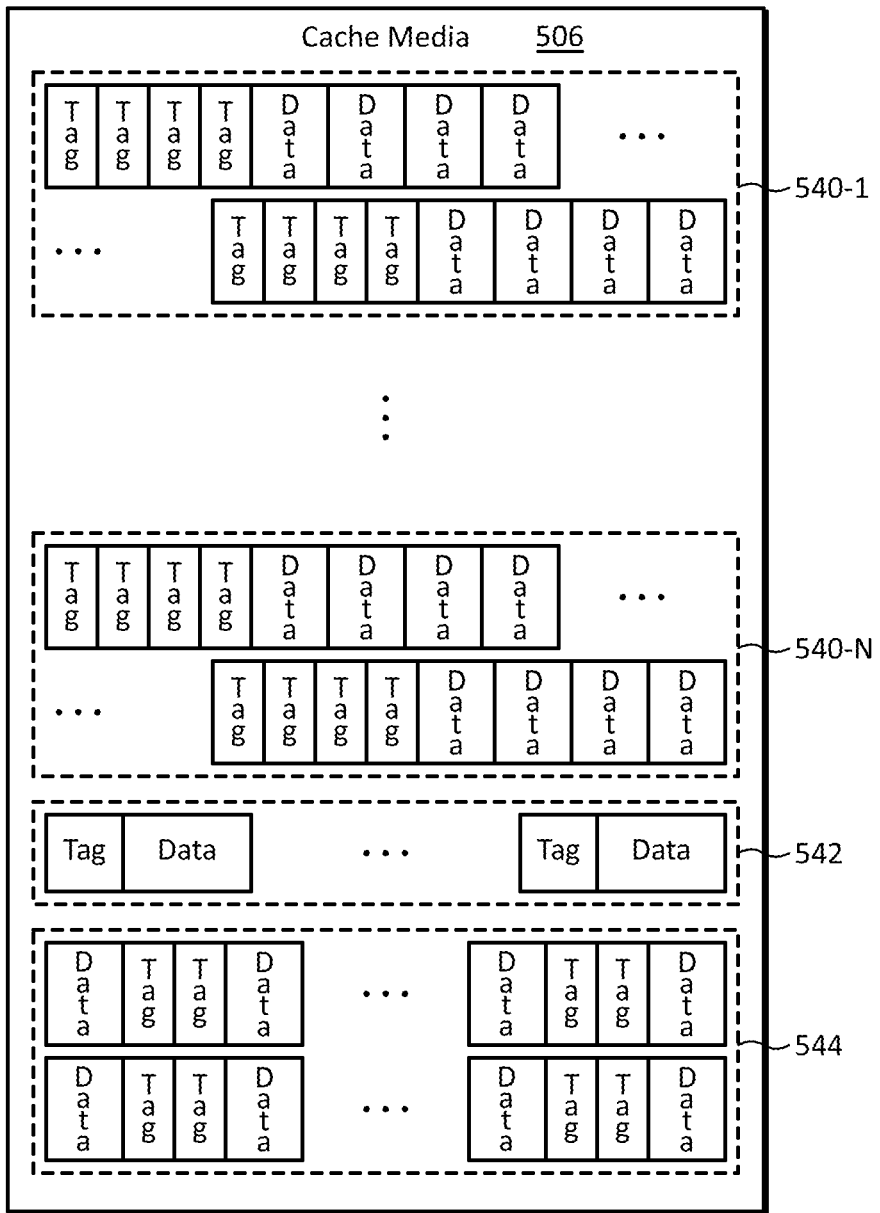
FIG. 5 illustrates an example embodiment of a metadata structure for device cache metadata in accordance with example embodiments of the disclosure.

FIG. 5 illustrates an example embodiment of a metadata structure for device cache metadata in accordance with example embodiments of the disclosure. The embodiment illustrated in FIG. 5 may used, for example, to implement some or all of the device cache metadata 423*a* and/or device cache 406 illustrated in FIG. 4. The metadata structure illustrated in FIG. 5 may include cache media 506 which, in this example, may be implemented with DRAM, but in other embodiments may be implemented with one or more other types of media. The cache media 506 may include portions 540-1, . . . , 540-N, one or more (e.g., each) of which may implement a 4-way set associative cache structure that may include a portion of the device cache metadata 423*a* (e.g., one or more tags, indexes, and/or the like) and corresponding cache data. Thus, depending on the implementation details, some or all of the device cache metadata 423*a* (e.g., one or more tags, indexes, and/or the like) and corresponding cache data may be organized in the same row and/or column of a page of DRAM.

FIG. 5 also illustrates some additional and/or alternative metadata structures that may be used with the device cache metadata 423*a* and corresponding cache data. For example, portion 542 may include one or more tags arranged with data in a direct mapping arrangement, and portion 544 may include one or more tags arranged with data in a 2-way set associative arrangement.

Figure 6:
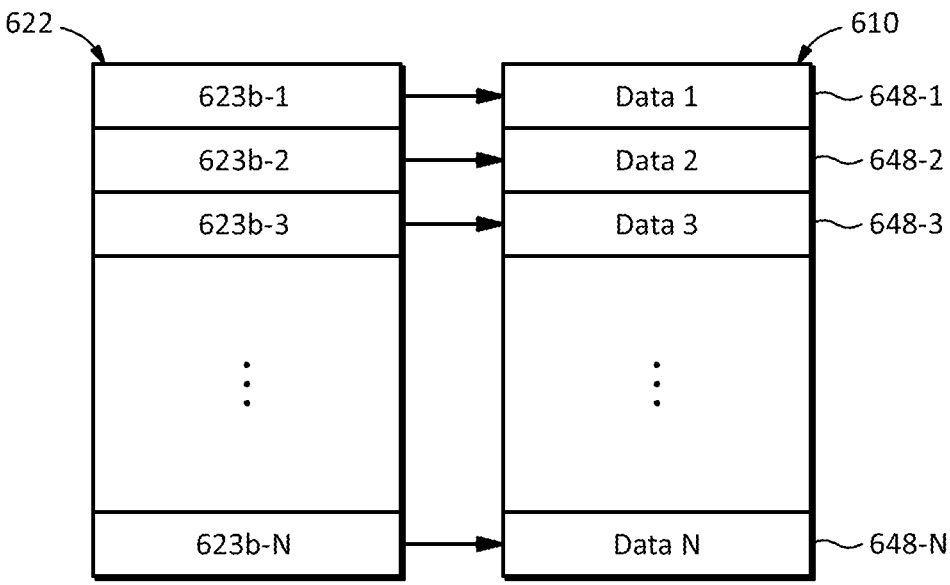
FIG. 6 illustrates an example embodiment of a metadata structure for garbage collection buffer metadata in accordance with example embodiments of the disclosure.

FIG. 6 illustrates an example embodiment of a metadata structure for garbage collection buffer metadata in accordance with example embodiments of the disclosure. The embodiment illustrated in FIG. 6 may used, for example, to implement some or all of the garbage collection buffer metadata 423*b* and/or garbage collection buffer 410 illustrated in FIG. 4. The metadata structure illustrated in FIG. 6 may implement a tag-in SRAM configuration in which garbage collection buffer metadata 623*b* (e.g., one or more tags, indexes, and/or the like) may be stored in metadata memory 622 that may be implemented, for example, with SRAM. All or a portion of the garbage collection buffer 610 may be implemented with DRAM. One or more (e.g., each) of the metadata 623b-1, 623b-2, . . . , 623-N, may point to corresponding cache data 648-1, 648-2, . . . , 648-N, respectively in the garbage collection buffer 610. The garbage collection buffer metadata 623b may be based, for example, on one or more LBAs, PBAs, and/or the like of one or more data entries in the garbage collection buffer 610. In some embodiments, at least a portion of the garbage collection buffer metadata 623b may be implemented with a hash table, with direct mapping, with set associative mapping, and/or the like.

Figure 7:
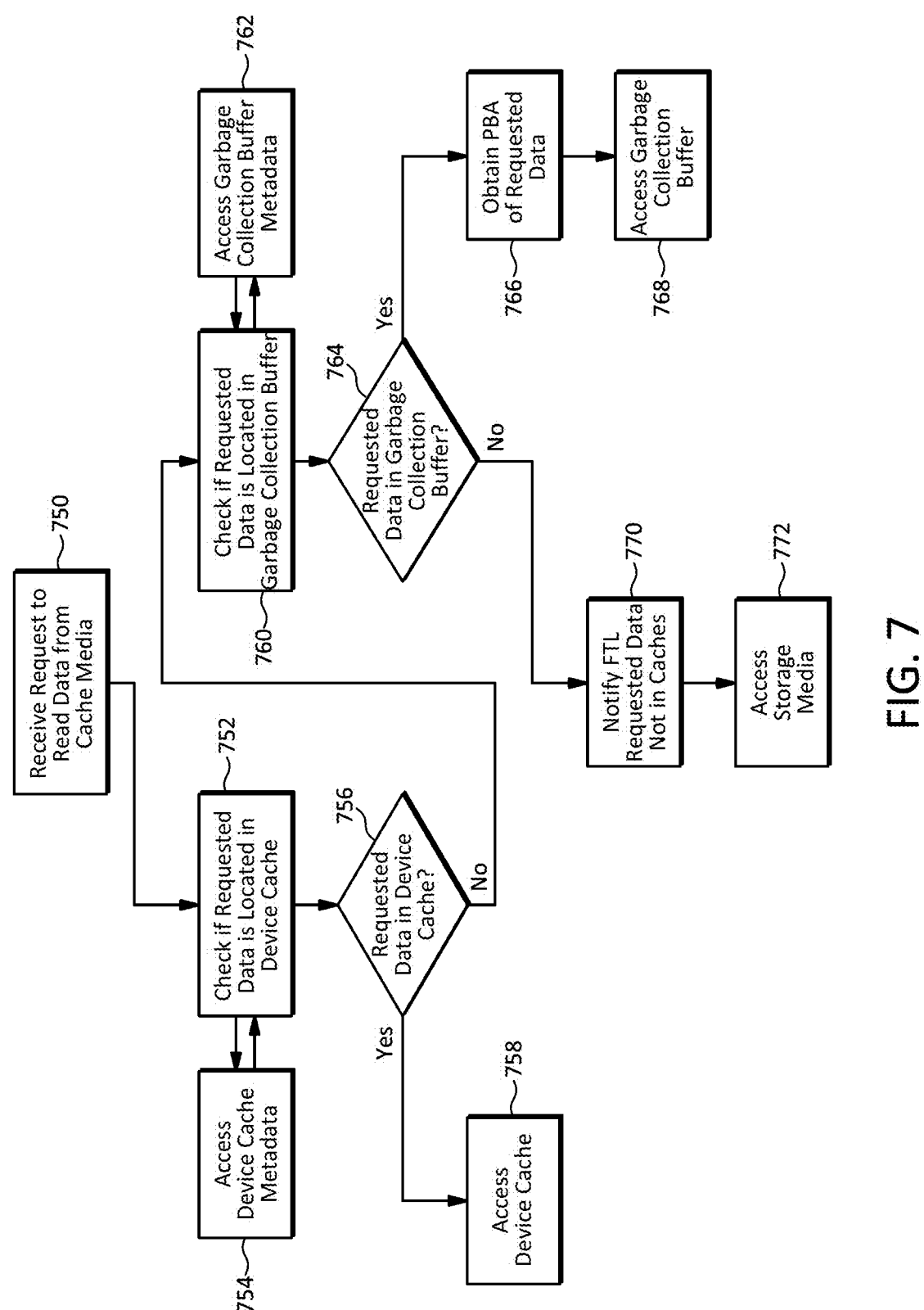
FIG. 7 illustrates an embodiment of a method for accessing one or more caches in a device in accordance with example embodiments of the disclosure.

FIG. 7 illustrates an embodiment of a method for accessing one or more caches in a device in accordance with example embodiments of the disclosure. For purposes of illustration, the method illustrated in FIG. 7 may be described with reference to the embodiments illustrated in FIG. 2, FIG. 3, FIG. 4, FIG. 5, and/or FIG. 6, but is not limited to any of the details disclosed therein.

Referring to FIG. 7, the method may begin at operation 750 at which a request to access data from one or more cache media may be received. For example, the cache manager 430 may receive a request from the MTL 424 to determine if data associated with a memory load command received by the first (e.g., CXL) command manager 436 may be located in either the device cache 406 or the garbage collection buffer 410. The request received by the cache manager 430 may include, for example, a memory address (e.g., a system memory address) of the requested data.

At operation 752, the method may check if the requested data (e.g., a copy of the requested data) is located in a device cache (e.g., device cache 406). In some embodiments, to perform the check, the method may proceed to operation 754 where it may access device cache metadata 423a stored in the metadata memory 422. After obtaining the device cache metadata 423a, the method may return to operation 752 where it may perform the check, for example, by comparing a tag, index, and/or the like, in device cache metadata 423a with a tag, index, and/or the like, contained within a memory address of the requested data.

At operation 756, if the method determines that the requested data is located in the device cache 406 (e.g., at least a portion of the device cache metadata 423a matches a corresponding portion of a memory address for the requested data) (a device cache hit), the method may proceed to operation 758 at which the method may access the requested data in the device cache 406. The method may send the requested data to the MTL 424 which may send the requested data to a user, for example, in response to a memory load command received by the first (e.g., CXL) command manager 436.

If, however, at operation 756, the method determines that the requested data is not located in the device cache 406 (a device cache miss), the method may proceed to operation 760, at which the method may check if the requested data (e.g., a copy of the requested data) is located in a garbage collection buffer (e.g., garbage collection buffer 410). In some embodiments, to perform the check, the method may proceed to operation 762 where it may access garbage collection buffer metadata 423b stored in the metadata memory 422. After obtaining the garbage collection buffer metadata 423b, the method may return to operation 760 where it may perform the check, for example, by comparing a tag, index, and/or the like, in garbage collection buffer metadata 423b with a tag, index, and/or the like, contained within a local storage address of the requested data. In some embodiments, a local storage address (e.g., a PBA) may correspond to a memory address of the requested data. A local storage address may be obtained, for example, using a CXL-to-LBA translation and/or an LBA-to-PBA mapping table. The cache manager 430 may request a local storage address from the MTL 424. Alternatively, or additionally, the MTL 424 may send a local storage address corresponding to the memory address of the requested data to the cache manager 430 when it sends the request to the cache manager at operation 750.

At operation 764, if the method determines that the requested data is located in the garbage collection buffer 410 (e.g., at least a portion of the garbage collection buffer metadata 423b matches a corresponding portion of an internal or local storage address for the requested data) (a garbage collection buffer hit), the method may proceed to operation 766 at which the method may obtain a PBA for the requested data, for example, from the MTL 424. At operation 768, the method may use the PBA to access the requested data in the garbage collection buffer 410. In some embodiments, the cache manager 430 may access the requested data in the garbage collection buffer 410 by placing a read request in the access request queue 325. The method may send the requested data to the MTL 424 which may send the requested data to a user, for example, in response to a memory load command received by the first (e.g., CXL) command manager 436.

If, however, at operation 764, the method determines that the requested data is not located in the garbage collection buffer 410 (a garbage collection buffer miss), the method may proceed to operation 770, at which the command manager 436 may notify the MTL 424 that the requested data is not located in the device cache 406 or the garbage collection buffer 410. Based on the notification, at operation 772 the MTL 424 may access the requested data from the storage media, for example, using the NAND interface layer 426. The MTL 424 may send the requested data to a user, for example, in response to a memory load command received by the first (e.g., CXL) command manager 436.

Figure 8:
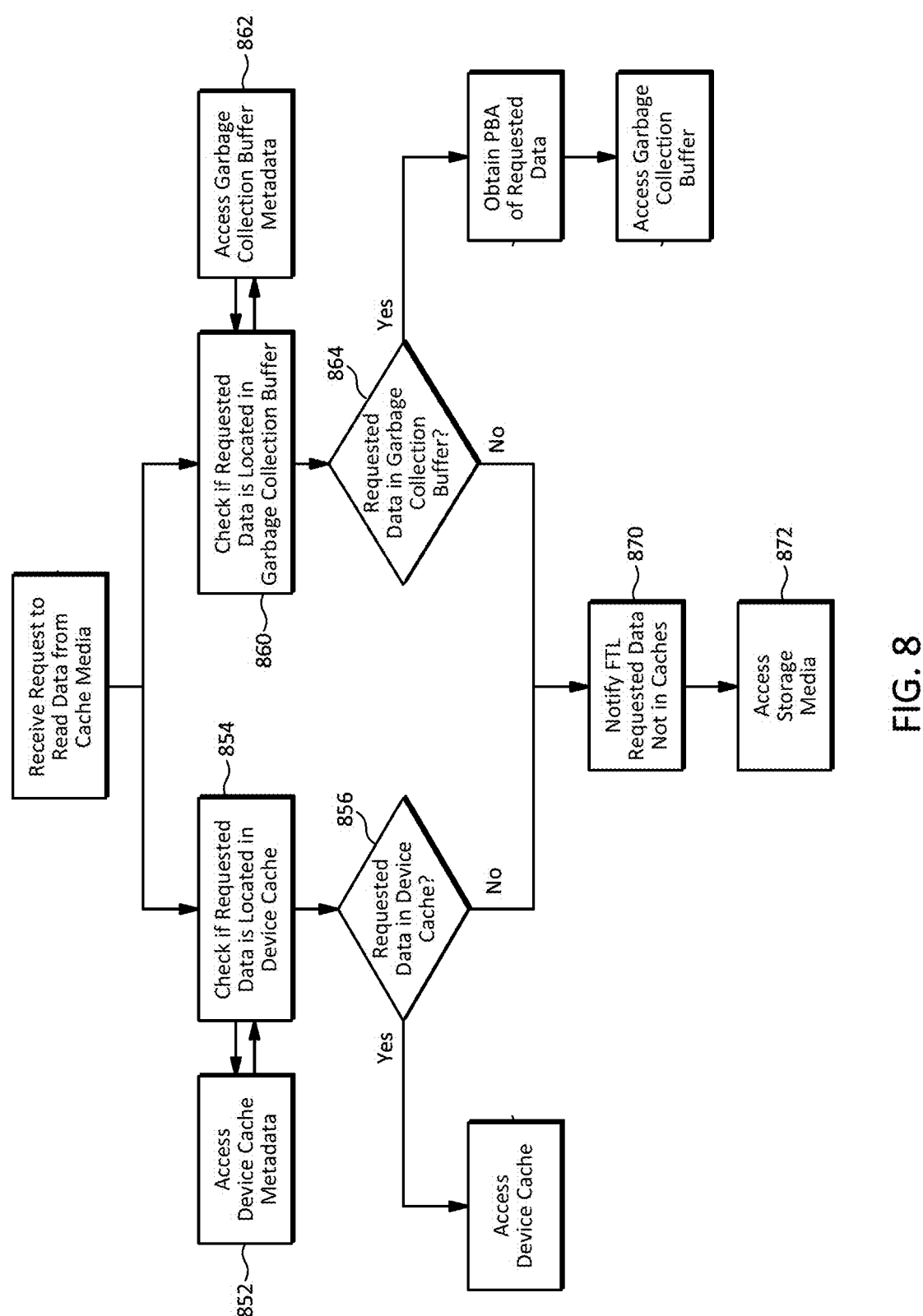
FIG. 8 illustrates another embodiment of a method for accessing one or more caches in a device in accordance with example embodiments of the disclosure.

FIG. 8 illustrates another embodiment of a method for accessing one or more caches in a device in accordance with example embodiments of the disclosure. For purposes of illustration, the method illustrated in FIG. 7 may be described with reference to the embodiments illustrated in FIG. 2, FIG. 3, FIG. 4, FIG. 5, FIG. 6, and/or FIG. 7, but is not limited to any of the details disclosed therein.

In some aspects, the operations of the method illustrated in FIG. 8 may be similar to the operations of the method illustrated in FIG. 7 in which similar elements may be indicated by reference numbers ending in, and/or containing, the same digits, letters, and/or the like. However, in the embodiment illustrated in FIG. 8, operations 852, 854, and/or 856 may be performed in parallel with operations 860, 862, and/or 864.

Moreover, at operation 856, if the method determines that the requested data is not located in the device cache 406 (a device cache miss), the method may proceed to operation 870 at which the command manager 436 may notify the MTL 424 that the requested data is not located in the device cache 406. Additionally, at operation 864, if the method determines that the requested data is not located in the garbage collection buffer 410 (a garbage collection buffer miss), the method may proceed to operation 870, at which the command manager 436 may notify the MTL 424 that the requested data is not located in the garbage collection buffer 410.

At operation 872, based on the notifications that the requested data is not located in the device cache 406 or the garbage collection buffer 410, the MTL 424 may access the requested data from the storage media, for example, using the NAND interface layer 426. The MTL 424 may send the requested data to a user, for example, in response to a memory load command received by the first (e.g., CXL) command manager 436.

Depending on the implementation details, performing some or all of operations 852 and/or 856 in parallel with operations 860 and/or 864 may reduce a latency associated with accessing data in the device cache 406 or the garbage collection buffer 410.

In some embodiments, memory media (e.g., device cache) may be configured as visible memory space backed up by storage media (e.g., storage media configured as invisible persistence space that may be used to persist data stored in the visible memory space). In such an embodiment, a request to access memory media configured as visible memory backed up by storage media may be referred to as a request to access the storage media. For example, in some implementations of the embodiment illustrated in FIG. 4, the control logic 408 may be configured to operate the device cache 406 (which may be implemented with volatile memory media) in a manner that may cause the device cache to appear to a user as visible persistent memory space. However, because the device cache 406 may be implemented with volatile memory media, the control logic 408 may be configured to operate some or all of the storage media 404 (which may be implemented with nonvolatile memory) as persistence space that may be invisible to the user but may be used to persist (e.g., save) data stored in the device cache 406, for example, in the event of a power loss. In such an embodiment, a request to access the device cache 406 (e.g., a load command, a store command, a copy command, and/or the like) may be referred to as a request to access the storage media.

Some embodiments may implement an architecture that may manage device cache and/or garbage collection buffer media, for example, in a storage device that may implement a memory access protocol such as CXL. In some embodiments, a cache manager may be implemented as a module that may manage device cache and/or garbage collection buffer media. Some embodiments may implement a cache metadata structure that may provide access to user data (e.g., in a device cache and/or garbage collection buffer) and/or garbage collection data. Some embodiments may implement a scheme for queue priority, for example, an access request queue that may have a different (e.g., higher) priority than a garbage collection read queue and/or a garbage collection write queue, for example, for a garbage collection buffer. Depending on the implementation details, one or more features in accordance with example embodiments of the disclosure may reduce an access latency (e.g., a tail latency) for accessing storage media in a device. In some embodiments, at least a portion of a first cache (e.g., a garbage collection buffer) may be used (e.g., reused or repurposed) as all or part of a second cache (e.g., a device cache).

Figure 9:
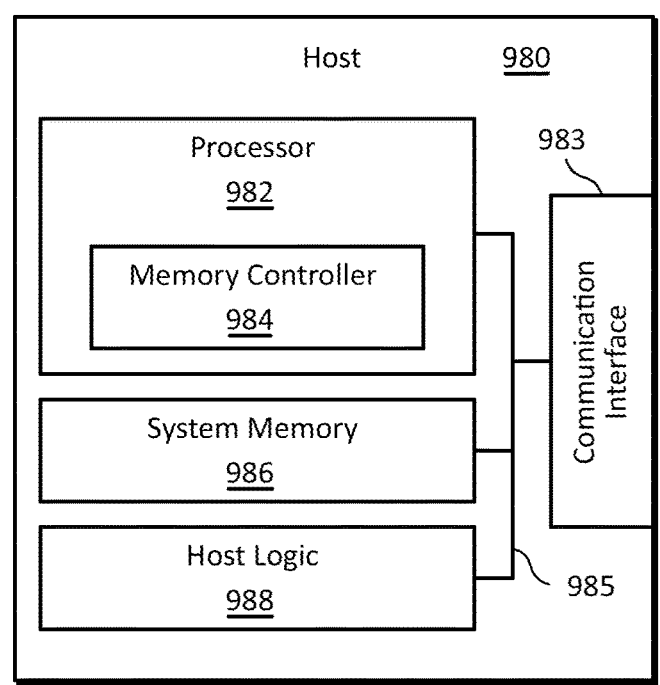
FIG. 9 illustrates an example embodiment of a host apparatus in accordance with example embodiments of the disclosure.

FIG. 9 illustrates an example embodiment of a host apparatus that may be used to implement any of the host and/or other user functionality disclosed herein in accordance with example embodiments of the disclosure. The host apparatus 980 illustrated in FIG. 9 may include a processor 982, which may include a memory controller 984, a system memory 986, host logic 988, and/or a communication interface 983. Any or all of the components illustrated in FIG. 9 may communicate through one or more system buses 985. In some embodiments, one or more of the components illustrated in FIG. 9 may be implemented using other components. For example, in some embodiments, the host logic 988 may be implemented by the processor 982 executing instructions stored in the system memory 986 or other memory.

The host logic 988 may be used to implement any of the host and/or other user functionality disclosed herein, for example, one or more of the host 401 and/or applications 438, as well as providing cache configuration information 420 to the storage device 402 as described above with respect to FIG. 4.

Figure 10:
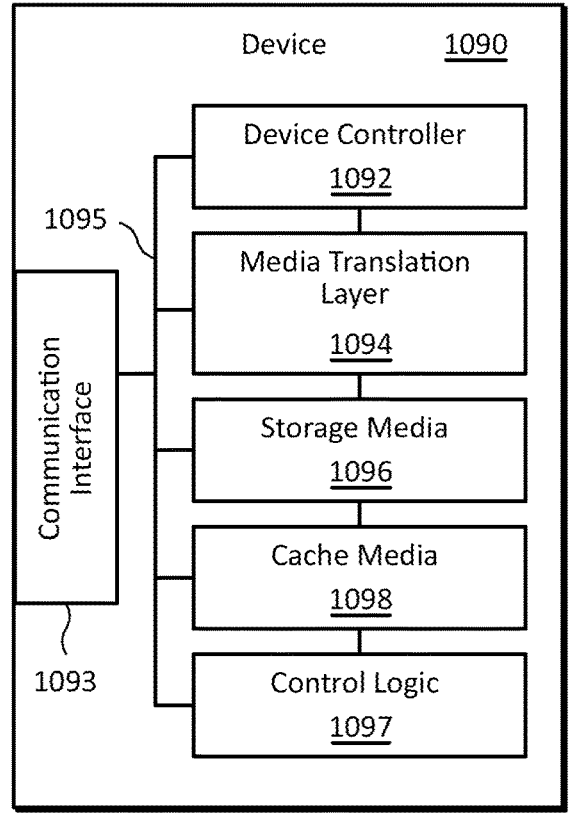
FIG. 10 illustrates an example embodiment of a device in accordance with example embodiments of the disclosure.

FIG. 10 illustrates an example embodiment of a device that may be used to implement any of the device functionality disclosed herein in accordance with example embodiments of the disclosure. The device 1090 may include a device controller 1092, a media translation layer 1094 (e.g., an FTL), storage media 1096, cache media 1098, control logic 1097, and/or a communication interface 1093. The components illustrated in FIG. 10 may communicate through one or more device buses 1095. In some embodiments that may use flash memory for some or all of the storage media 1096, the media translation layer 1094 may be implemented partially or entirely as a flash translation layer (FTL).

The control logic 1097 may be used to implement any of the device functionality disclosed herein, for example, one or more of the garbage collection logic, queues, media translation layer, flash translation layer, cache manager, command managers, and/or the like as described above with respect to FIG. 1, FIG. 2, FIG. 3, and/or FIG. 4.

FIG. 11 illustrates an embodiment of a method for accessing cache medium at a device in accordance with example embodiments of the disclosure. The method may begin at operation 1102. At operation 1104, the method may receive, at a device comprising a storage medium, a first request to access the storage medium, wherein the device further comprises a cache medium and a buffer medium. For example, referring to FIG. 2, a device 202 having a storage medium 204, a first cache 206, and a second cache 210 may receive a first request 209 to access the storage medium 204.

Referring to FIG. 11, at operation 1106, the method may access, based on the first request, the cache medium. For example, referring to FIG. 3 and FIG. 7, the control logic 308 may access, at operation 768, the garbage collection buffer 310.

Referring to FIG. 11, at operation 1108, the method may copy, from a portion of the storage medium to the buffer medium, data. For example, referring to FIG. 3, the garbage collection logic 318 may copy from the storage medium 304 to the garbage collection buffer 310, valid data 311 for a garbage collection operation.

Referring to FIG. 11, at operation 1110, the method may modify, based on the copying, to an available state, the portion of the storage medium. For example, referring to FIG. 3, the garbage collection logic 318 may erase one or more availability units (e.g., erase blocks) 314 from which valid data was copied to the garbage collection buffer 310.

Referring to FIG. 11, at operation 1112, the method may receive, at the device, a second request to access the storage medium. For example, referring to FIG. 2, the device 202 may receive a second request 209 to access the storage medium 204.

Referring to FIG. 11, at operation 1114, the method may access, based on the second request, the buffer medium. For example, referring to FIG. 3 and FIG. 7, the control logic 308 may access, at operation 758, the device cache 306. The method may end at operation 1116.

The embodiment illustrated in FIG. 11, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Any of the functionality described herein, including any of the functionality that may be implemented with a host, a device (e.g., a storage device), and/or the like, or a combination thereof, including, for example, any of the caches (e.g., device cache, garbage collection buffer), metadata memory, and/or control logic such as the garbage collection logic, queues, media translation layer, flash translation layer, cache manager, command managers, and/or the like, may be implemented with hardware (e.g., circuitry), software, firmware, or any combination thereof including, for example, hardware and/or software combinational logic, sequential logic, timers, counters, registers, state machines, volatile memories such DRAM and/or SRAM, nonvolatile memory including flash memory, persistent memory such as cross-gridded nonvolatile memory, memory with bulk resistance change, PCM, and/or the like, one or more complex programmable logic devices (CPLDs), field programmable gate arrays (FPGAs), application specific integrated circuits (ASICs), processors including one or more complex instruction set computer (CISC) processors such as x86 processors and/or reduced instruction set computer (RISC) processors such as ARM processors, graphics processing units (GPUs), neural processing units (NPUs), tensor processing units (TPUs), data processing units (DPUs) and/or the like, executing instructions stored in any type of memory, or any combination thereof. In some embodiments, one or more components may be implemented as a system-on-chip (SOC).

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner. The various details and embodiments described above may be combined to produce additional embodiments according to the inventive principles of this patent disclosure.

Since the inventive principles of this patent disclosure may be modified in arrangement and detail without departing from the inventive concepts, such changes and modifications are considered to fall within the scope of the following claims.

The invention claimed is:

1. A method comprising:

receiving, at a device comprising a storage medium, a first request to access the storage medium, wherein the device further comprises a cache manager, garbage collection logic, a cache medium, and a buffer medium;

accessing by the cache manager, based on the first request, the cache medium;

copying by the garbage collection logic, from a portion of the storage medium to the buffer medium, data that is involved in a garbage collection operation using a garbage collection write queue having a first priority level;

modifying, based on the copying, an availability of the portion of the storage medium;

receiving, at the device, a second request to access the storage medium; and accessing by the cache manager, based on the second request, the buffer medium using an access request queue having a second priority level that is higher than the first priority level.

2. The method of claim 1, further comprising:

determining a location of data associated with the second request; and accessing, based on the determining, the buffer medium.

3. The method of claim 1, further comprising:

receiving information about a location of data associated with the second request; and accessing, based on the information, the buffer medium.

4. The method of claim 3, wherein the information comprises a portion of an address.

5. The method of claim 3, wherein the information comprises a portion of a data structure.

6. The method of claim 1, wherein:

the first request comprises a first memory access request; and the second request comprises a second memory access request.

7. The method of claim 1, wherein:

the accessing, based on the second request, the buffer medium, is performed with the second priority level; and the copying is performed with the first priority level.

8. A device comprising:

a storage medium;

a cache medium;

a buffer medium; and at least one control circuit configured to perform one or more operations comprising:

receiving a first request to access the storage medium;

accessing, based on the first request, the cache medium;

copying, from a portion of the storage medium to the buffer medium, data that is involved in a garbage collection operation using a write queue having a first priority level;

modifying, based on the copying, an availability of the portion of the storage medium;

receiving a second request to access the storage medium; and accessing, based on the second request, the buffer medium using an access request queue having a second priority level that is higher than the first priority level.

9. The device of claim 8, wherein the one or more operations further comprise:

determining a location of data associated with the second request; and accessing, based on the determining, the buffer medium.

10. The device of claim 8, wherein:

the one or more operations further comprise receiving information about a location of data associated with the second request; and the accessing the buffer medium is based on the information.

11. The device of claim 10, wherein the information comprises a portion of an address.

12. The device of claim 10, wherein the information comprises a portion of a data structure.

13. The device of claim 8, wherein:

the write queue is configured to store an access request for the copying; and the access request queue is configured to store the second request.

14. The device of claim 8, wherein:

the one or more operations further comprise accessing, based on the second priority level, the buffer medium; and the copying is based on the first priority level.

15. The device of claim 8, wherein the portion of the storage medium is a first portion of the storage medium, and the one or more operations further comprise:

reading, from the buffer medium, based on the copying, the data; and storing, in a second portion of the storage medium, the data.

16. The device of claim 15, wherein:

the accessing the buffer medium is based on the second priority level; and the reading is based on the first priority level.

17. A device comprising:

a storage medium;

a cache medium;

a buffer medium; and at least one control circuit configured to perform one or more operations comprising:

receiving a first request to access the cache medium;

accessing, based on the first request, device cache metadata comprising status information for the cache medium;

accessing, based on the status information, the cache medium;

copying, from a portion of the storage medium to the buffer medium, data that is involved in a garbage collection operation using a garbage collection write queue;

modifying, based on the copying, an availability of the portion of the storage medium;

receiving a second request to access the storage medium; and accessing, based on the second request, the buffer medium.

18. The device of claim 17, wherein the one or more operations further comprise accessing, based on the request, the storage medium.

19. The device of claim 17, wherein:

the one or more operations further comprise receiving information about a location of data associated with the request; and the accessing is based on the information.

20. The device of claim 17, wherein the device cache metadata is implemented with a tag-in dynamic random access memory configuration.

* * * * *